United States Patent [19]

Strazdins

[11] Patent Number: 4,966,308
[45] Date of Patent: * Oct. 30, 1990

[54] DOUBLE PISTON COLORANT DISPENSER

[75] Inventor: Atis Strazdins, Unanderra, Australia

[73] Assignee: Strazdins (International) Pty. Limited, Sydney, Australia

[*] Notice: The portion of the term of this patent subsequent to Oct. 23, 2007 has been disclaimed.

[21] Appl. No.: 211,743

[22] Filed: Jun. 27, 1988

[30] Foreign Application Priority Data

Jun. 24, 1987 [AU] Australia .................................. PI2662

[51] Int. Cl.⁵ .......................... B65D 5/08; G01F 11/04
[52] U.S. Cl. ...................................... 222/43; 222/253; 222/309
[58] Field of Search ..................................... 222/41–43, 222/135, 144, 252–253, 275, 309, 380

[56] References Cited

U.S. PATENT DOCUMENTS

| 2,988,248 | 6/1961 | Bender et al. | 222/309 |
| 3,052,376 | 9/1962 | Fogg | 222/43 |
| 3,064,864 | 11/1962 | O'Neill, Jr. | 222/517 |
| 4,074,831 | 2/1978 | Roach | 222/309 |
| 4,781,312 | 11/1988 | Strazdins | 222/309 |

Primary Examiner—Joseph J. Rolla
Assistant Examiner—Steven M. Reiss
Attorney, Agent, or Firm—Vorys, Sater, Seymour and Pease

[57] ABSTRACT

A liquid dispenser having two separate sized dispensing chambers. The first being larger volume dispenser having a piston which is of variable stroke to move within a first chamber to draw liquid into the chamber and then to force the liquid out of said chamber. The second being a smaller volume dispenser which comprises a second piston which is of variable stroke and moves within a bore in said first piston to draw liquid into said bore and to force liquid out of said bore.

1 Claim, 8 Drawing Sheets

DOUBLE PISTON COLORANT DISPENSER

CROSS-REFERENCE TO RELATED APPLICATIONS

This application is related to copending U.S. application Ser. No. 07/210,862 filed Jun. 24, 1988; as well as to U.S. application Ser. Nos.: 07/210,863 filed on Jun. 24, 1988 and now abandoned and 07/210,864 filed on Jun. 24, 1988 and now abandoned.

The present invention relates to an apparatus for the dispensing a measured amount of liquid and in particular to a dispenser for colourant for the addition to a base paint to produce a reproducible quantity of colourant.

The problem associated with constructing a dispenser for dispensing variable volumes of both small and large quantities of liquids is the reproducibility of the dispensing of the smaller volumes, as in the prior art dispensers a relatively large diameter piston is required or else the length of the piston on stroke becomes prohibitive for the larger volumes. Thus for very small volumes, small variations in the length of stroke causes extreme differences in the actual volume discharged.

In the case of dispensing of paint colourants to be added to a base coat to produce paints of an extremely light hue, reproducibility of the volume of colourant dispense is extremely important for the correct reproduction of the particular colour.

The present invention seeks to ameliorate this problem by utilizing a liquid dispenser comprising;
a housing;
an inlet to the housing;
an outlet from said housing
a valve having a first position to open said inlet while at the same time close said outlet and having a second position to close said inlet while at the same time open said outlet;
a first variable stroke piston, adapted to move within said housing, so as to draw liquid into said housing when said valve is in its first position and to force liquid out of said housing when said valve is in its second position;
a bore located within said piston;
a second variable stroke piston adapted to move along said bore so as to draw liquid into said bore when said valve is in its first position and to force liquid in said bore out of the outlet of said housing when said valve is in its second position.

The invention will now be described by way of example with reference to the accompanying drawings, in which.

As shown in the drawings, the paint colourant dispenser of one embodiment of the present invention comprises a paint colourant storage tank 1, connected to a dispensing valve 2. The colourant is drawn into the measuring chamber 3 by means of the plunger system 4 which is in slideable sealing engagement within the measuring chamber 3 and will be described in detail later. The quantity of colourant required is picked on the gauge 5 or 6 and the respective plunger system 4 lifted to raise the respective plunger to line up the required marking on the respective gauge with the reference marker.

Figure 3:
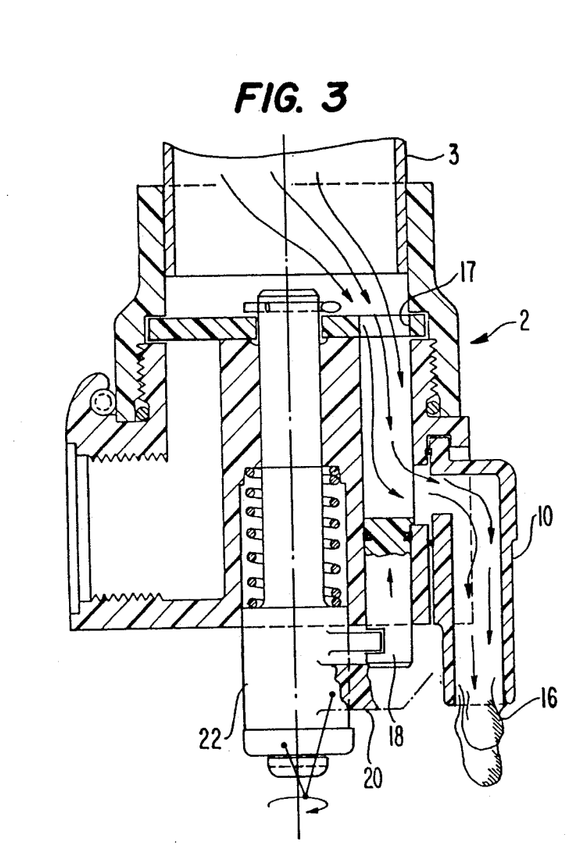
FIG. 3 illustrates a similar view to that of FIG. 2 showing the valve in its delivery mode.

The operating lever 7 is then moved (as shown in FIG. 3) to seal the entrance 8 between the storage tank 1 and the measuring chamber 3 by means of the valve 9 which simultaneously opens communication between the measuring chamber 3 and the outlet nozzle 10. The respective plunger is then pushed downwardly to force the colourant in the measuring chamber 3 out of the nozzle 10.

Figure 1:
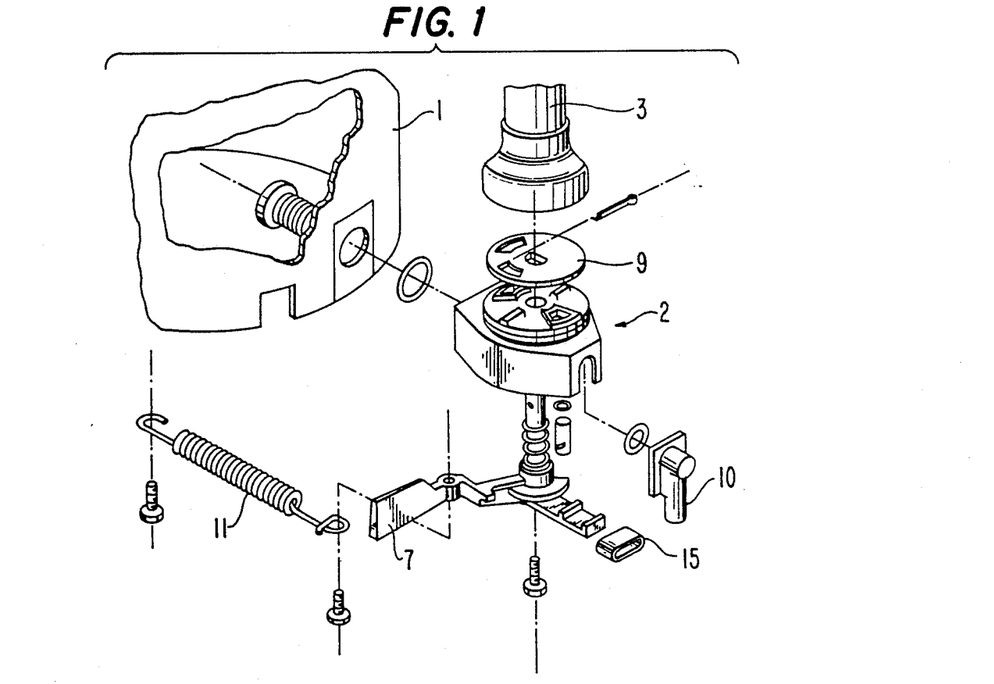
FIG. 1 illustrates an exploded view of the outlet and inlet of one embodiment of the present invention.
Figure 2:
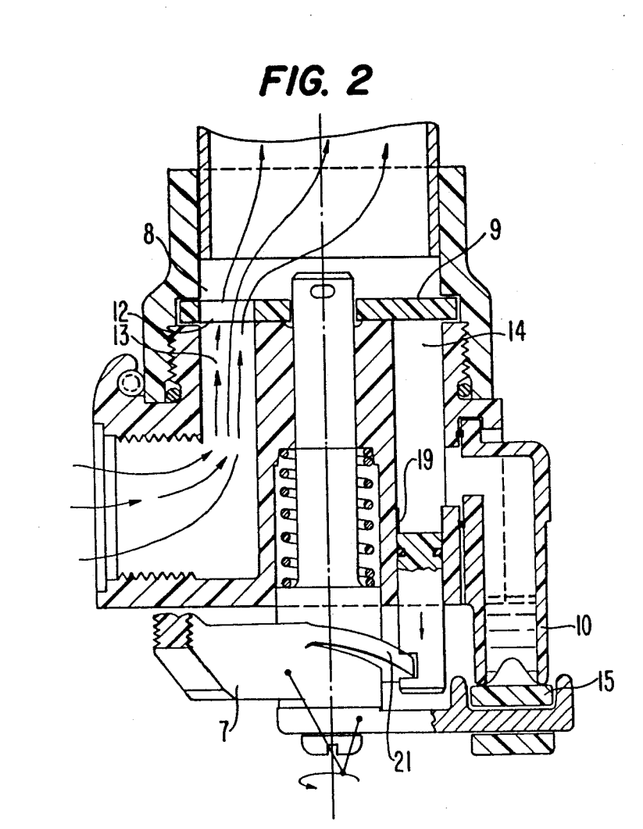
FIG. 2 illustrates a partial section of the valve of the embodiment shown in FIG. 1 with the valve in the dispenser filling or nozzle closing mode.

As shown in FIG. 1 the valve 9 is biased in the non-delivery position by a spring 11 holding the operating lever 7 which results in the position of the valve 9 as shown in FIG. 2.

In this position, the opening 12 in the valve 9 is lined up with the passageway 13 allowing communication between the storage tank 1 and the measuring chamber 3. In this mode the passageway 14 is blocked by the valve 9 and closure 15, a rubber pad, seals against the nozzle outlet 16.

When the valve 9 is turned to its delivery position the passageway 13 is blocked and the opening 17 aligns with the passageway 14 to allow the colourant in the measuring chamber 3 to be forced out of the dispenser. In the fully open position the piston 18, which is in slideable sealing engagement in the cylinder 19, is positioned such that its top is substantially level with the inlet to the nozzle 10.

Due to the viscosity and surface tension of the colourant liquid a quantity of liquid remains in the nozzle 10 and forms a bubble or miniscus at the nozzle outlet 16. To overcome this problem the piston 18 has a recess 20 into which fits an angled cam/projection 21 connected to the spindle drive 22 of the valve 9.

When the required amount of colourant has been discharged the lever 7 is allowed to return to its non discharge mode position as shown in FIG. 2 resulting firstly in the valve 9 blocking the passageway 14, and then causing the piston 18 to be drawn deeper into the cylinder 19 by means of the recess 20 riding down the sloping cam 21. Because the valve 9 effectively seals the passageway 14 from the measuring chamber 3 and the piston 18 sealing engages in the cylinder 19 a reduced pressure occurs in the passageway 14 sucking the liquid remaining in the nozzle 10 and/or the liquid bubble or miniscus at the outlet 16 back up the nozzle 10 such that the closure 15 can sealingly engage the outlet 16, with a reduced or eliminated smearing of colourant on the closure 15. As shown in the drawings the nozzle 10 slideably fits into the dispensing valve body 2 in sealing engagement therewith.

A problem arises in metering out both large and small volumes to produce repeatability of results. To overcome this problem the plunger system of the present invention was produced.

An embodiment of it is illustrated with reference to FIGS. 4 to 8.

As is the same with prior art dispensers, the gauge 5 can be moved along the large volume plunger shaft 23. However, the plunger shaft 23 together with the gauge 5 can be rotated as shown in FIG. 5 from the central free moving position of the gauge 5 as shown in FIG. 7 to the left or right to lock the gauge 5 into the specific measure shown on the gauge 5.

Figure 4:
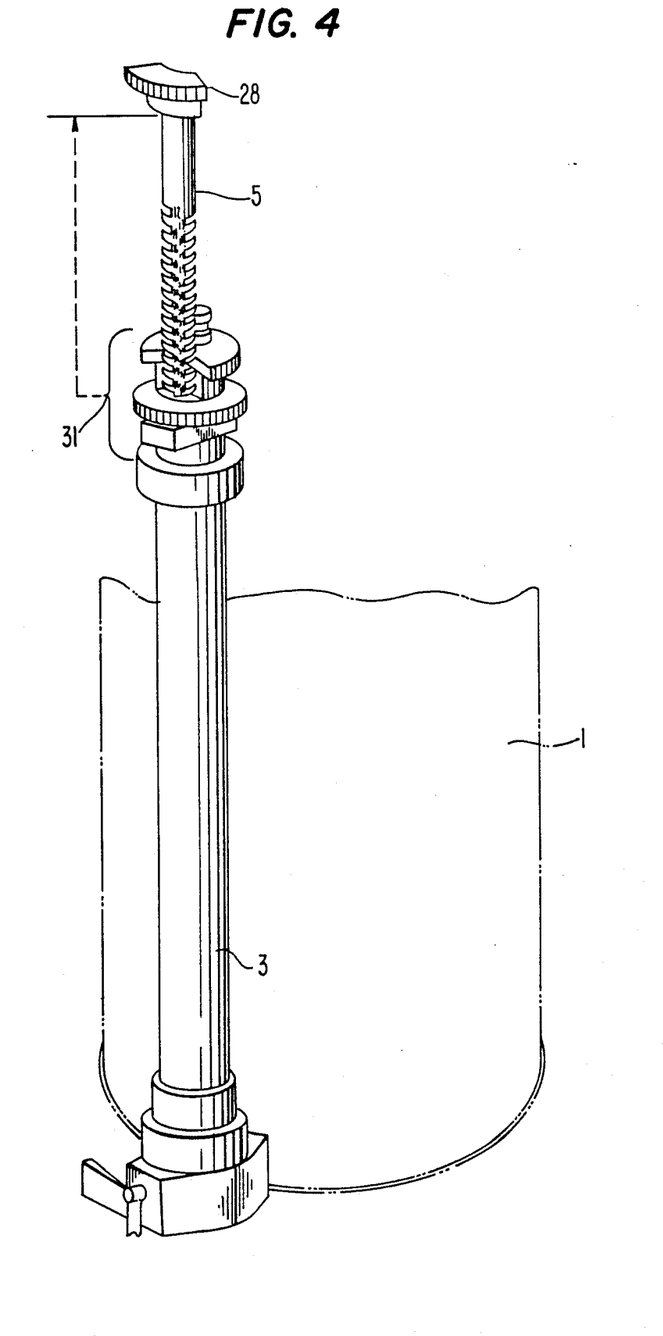
FIG. 4 illustrates one embodiment of the present invention showing the gauge for the larger volume of colourant in a set position.
Figure 5:
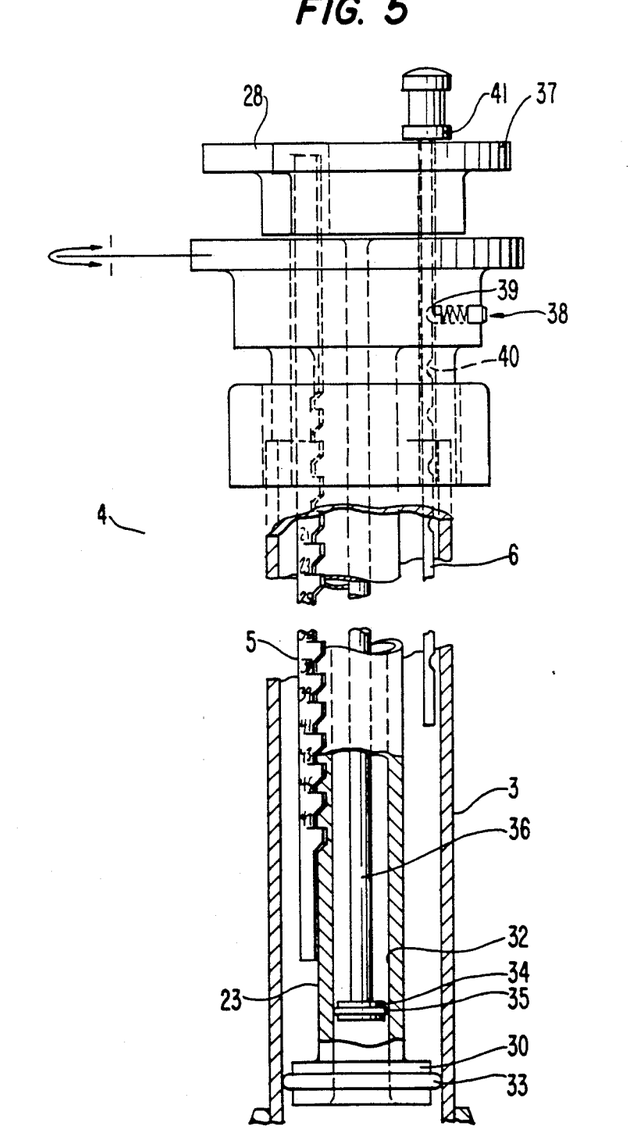
FIG. 5 illustrates a cut-away view of the embodiment of FIG. 4 showing the measuring chamber and the two piston arrangement.
Figure 6:
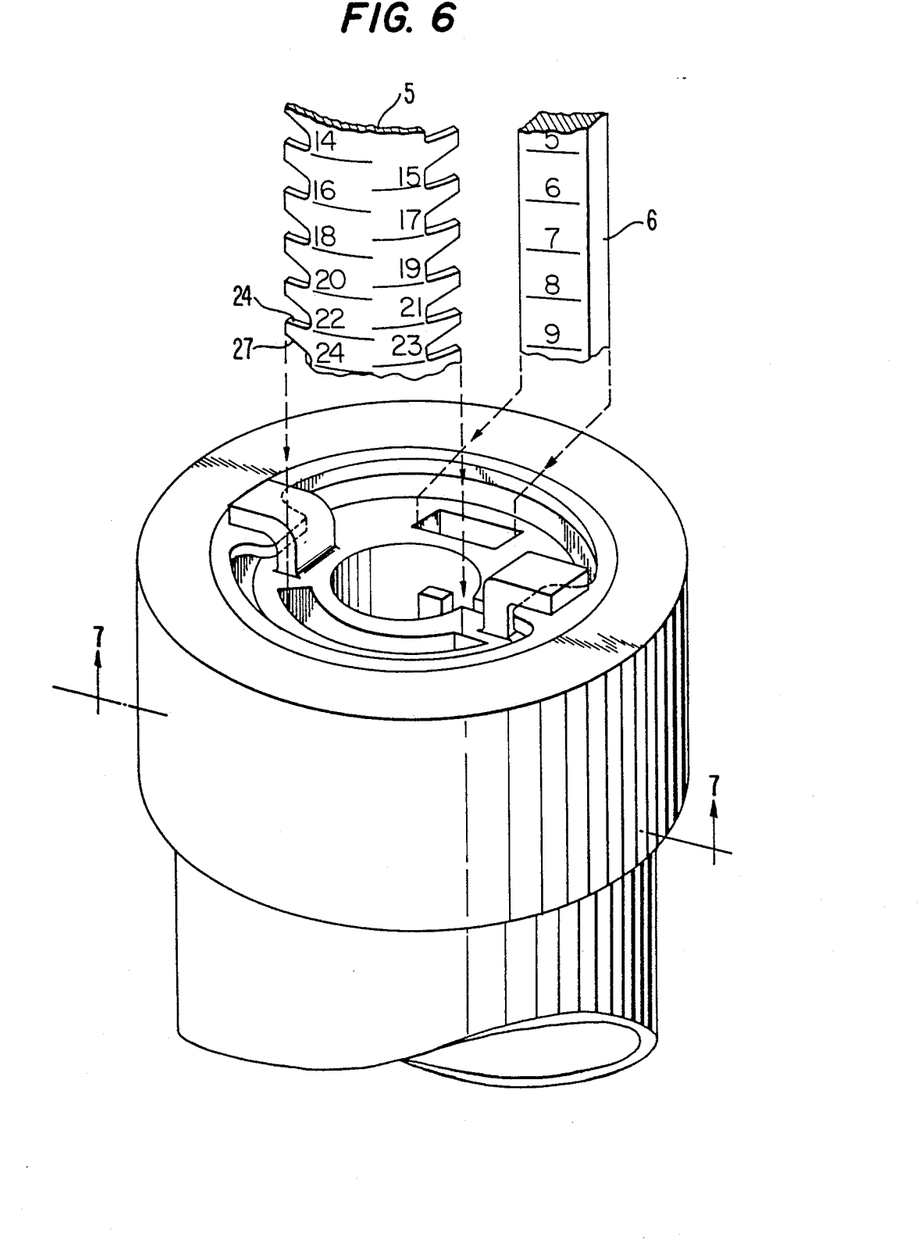
FIG. 6 shows an exploded detail of the gauge head of the measuring chamber.

As is shown in FIGS. 4, 5 and 6 the gauge 5 has two series of measurements; on one side the even numbered measures and on the other the odd numbered.

To measure a larger volume of colourant the gauge 5 is raised by its handle 28 as shown in FIG. 4, to align the required measure with the locking plate 26.

Figure 7:
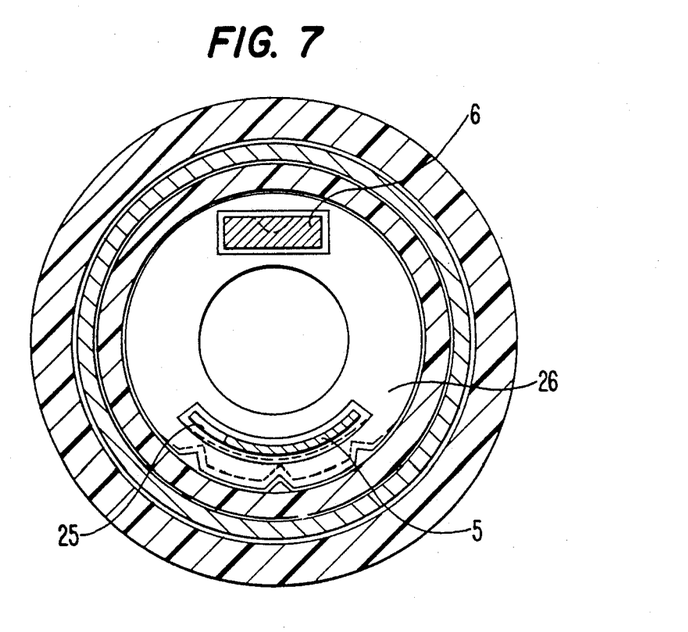
FIG. 7 shows a sectional view taken in the direction of arrows VII–VIII in FIG. 6.

To lock the gauge 5 and thus the plunger into a particular measurement, the chosen measurement is adjusted to line up with the locking plate 26 and the plunger shaft 23 and the gauge are rotated to the left (as shown in FIG. 7) for even measures and to the right for odd measures. Because the bottom edge 27 of the protrusions 25 are tapered and the top edge 24 are parallel to the surface of the locking plate 26, each measure on the gauge is exactly reproducible.

With the gauge 5 thus locked into the locking plate 26, the bottom of the gauge 5 determines the upward movement of the piston 30, which sealingly engages the walls of the measuring chamber 3 by an O-ring 33. The piston 30 is raised by means of moving the head 31 of the plunger shaft 23 to its permitted movement when the top of the piston 30 abuts against the bottom of the gauge 5.

Located within the plunger shaft 23 is a bore 32. A piston 34 sealingly engages the bore 32 by means of an O-ring 35. A plunger shaft 36, runs up the bore 32, to connect to the plunger head 37.

Figure 8:
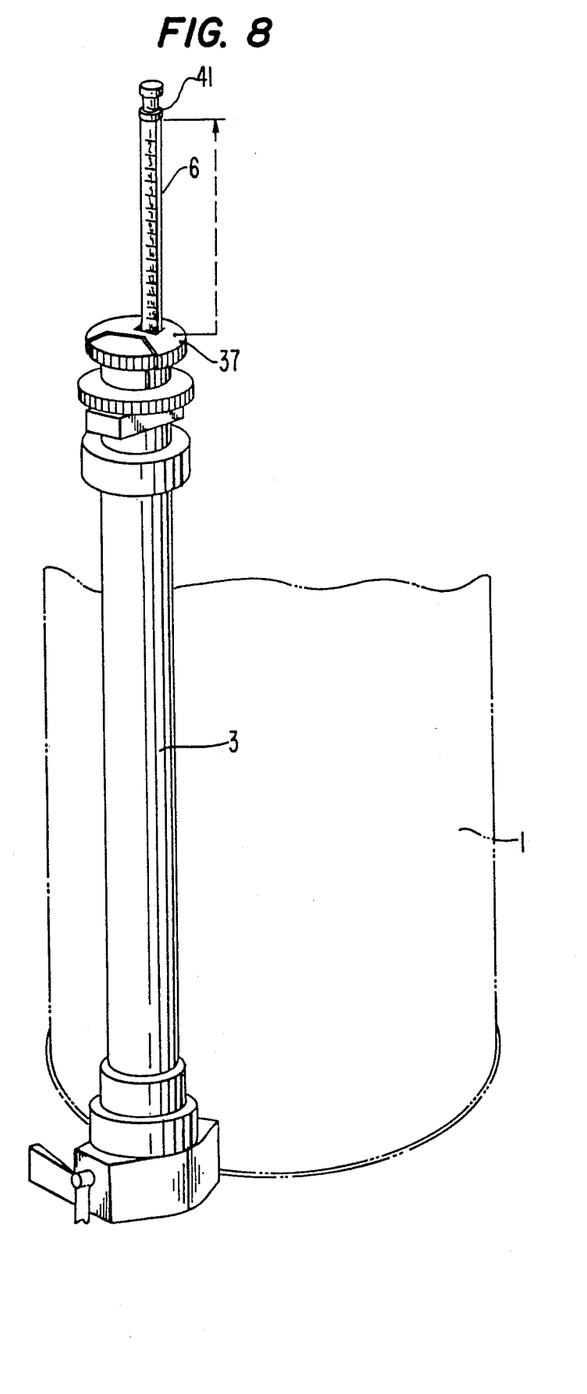
FIG. 8 illustrates the embodiment of FIG. 4 showing the small volume gauge in a set position.

The small volume gauge 6 as shown in FIG. 8 is raised to the required measure, by releasing the lock 38. The lock 38, as shown in FIG. 5 is spring loaded forcing a projection 39 into a complementary recess 40 in the gauge 6. Each recess is positioned so as to align the measures on the gauge 6 with the top of the head 37. The colourant is drawn into the bore 32 by raising the head 37 till it abuts against the stop 41, thereby drawing the required amount of colourant into the bore 32. The head 37 is then pushed down to the position shown in FIG. 8 with the valve 9 in its delivery mode to discharge the colourant from the bore 32.

A further embodiment is shown in FIGS. 9 to 12 wherein the gauges and locking means are modified, such that the gauges are held at the required measures by the means of bores and mating pins.

Figure 9:
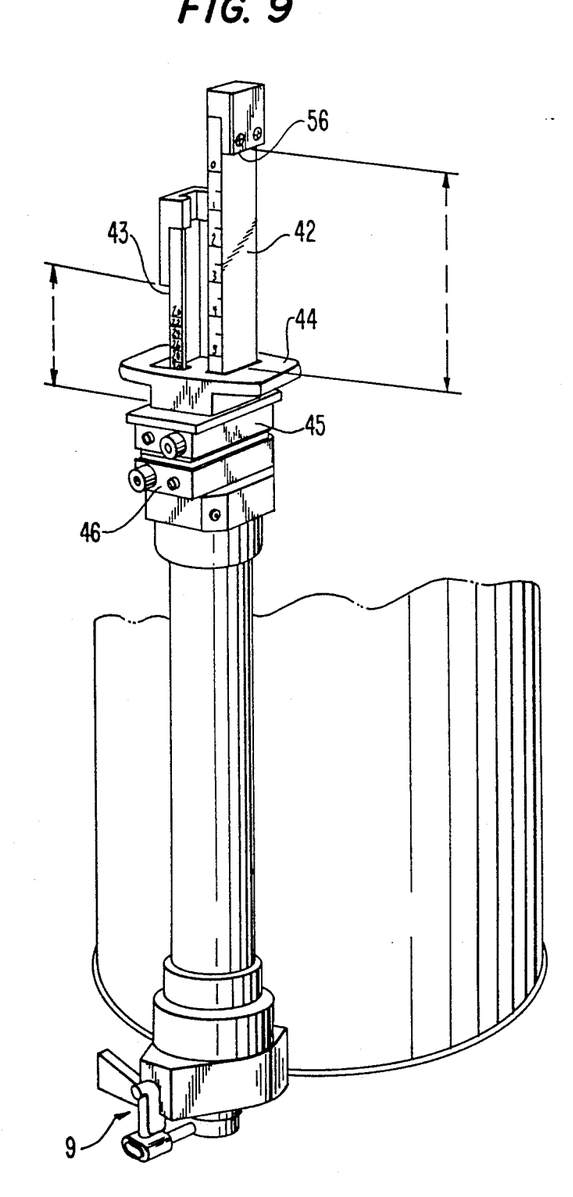
FIG. 9 illustrates another embodiment of the present invention.
Figure 10:
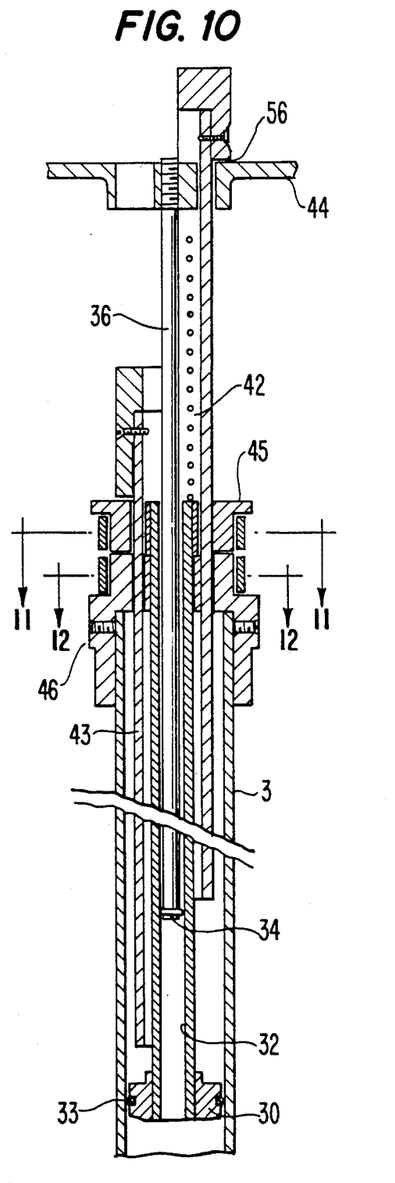
FIG. 10 shows a part longitudinal section through the dispenser of FIG. 9.
Figure 11:
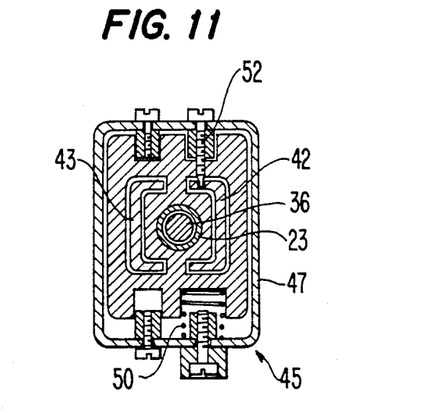
FIG. 11 is a cross-sectional view of FIG. 10 taken in the direction of arrows 11—11.
Figure 12:
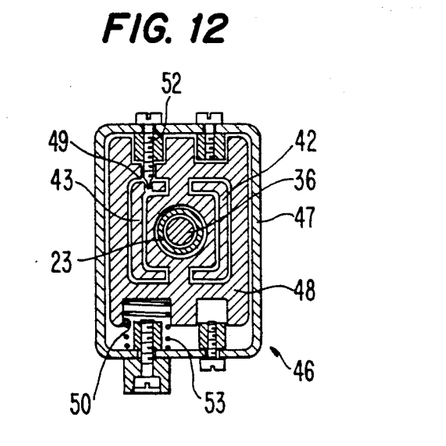
FIG. 12 is a cross-sectional view of FIG. 10 taken in the direction of arrows 12—12.

As shown in FIGS. 9 and 10 each gauge 42 and 43 comprise U shaped channels, which extend through the plunger head 44. Associated with each gauge 42 and 43 is a releasable lock 45 and 46 respectively. As shown in FIGS. 9, 11 and 12 the lock 46 comprise a shell 47 which surrounds the housing 48 through which the gauges 42 and 43 and the large volume plunger 23 pass through respective bores; the lock being connected to the measuring chamber 3.

The large volume gauge 43 has holes 49 located on the rear arm of the gauge with the appropriate measure located on the front arm of the gauge. The housing 48 has a recess 50 and on the reverse side a bore 51 which extends through to the gauge 43. Connected to the shell 47 is a pin 52 which extends through the bore 51 and mates with the holes 49 in the gauge 43.

Connected to the other side of the shell 47 is spring 53 which urges the pin 52 into its engagement with the gauge 43.

To set the gauge, force is exerted on the shell 47 to compress the spring 53, and move the rear of the shell 47 away from the housing 48 to disengage the pin 52 from the gauge 43, where by the gauge 43 is raised to the required measure and the shell 47 released to engage the pin 52 into the respective hole relating to the new measure.

As shown in FIG. 11, similar construction and operation to the lock 46, is utilized for the lock 45 for the small volume gauge 42, except that the plunger shaft 36 passes through the housing, the with large volume plunger shaft 23 fixed to the housing 54. Further the pin 55 engage into the small volume gauge 42.

The operation of the small volume discharge is shown in FIG. 10, wherein the gauge 42 is raised to the required measure and the plunger head 44 is raised where it abuts against the shoulder 56, raising the small plunger piston 34 up the bore 32 and draws the required amount of colourant into the unit. The head 44 is then pushed down to the position shown in FIG. 9 with the valve 9 in its delivery mode (see FIG. 3) to discharge the colourant from the bore 32.

If a large volume measure is required the gauge 43 is set to the required measure, with the small-volume gauge 42 set on zero. The plunger head 44 is then raised which, engaging on the shoulder 56 of the small volume gauge 42, raises the small volume gauge lock 45. As the large volume plunger shaft 23 is connected to the housing of the small volume gauge lock 45, the large volume plunger shaft is also raised.

The piston 30 engages on the bottom 57 of the large volume gauge 43, when the plunger head 44 is raised to the set height of the gauge 43.

Thus the present invention provides a liquid dispenser capable of dispensing predetermined quantities of liquids in two ranges; one being small with respect to the other range, with reproducibility of results.

It should be obvious to people skilled in the art that variations and modifications could be made to the above without departing from the spirit or scope of the present invention.

I claim:

1. A liquid dispenser comprising;
   a housing;
   an inlet to the housing;
   an outlet from said housing;
   a valve operably connected to said housing and being operable such that whenever in a first position said inlet is opened while at the same time said outlet is closed and whenever in a second position said inlet is closed while at the same time said outlet is opened;
   a first variable stroke piston, moveable within said housing, so as to draw liquid into said housing when said valve is in its first position and to force liquid out of said housing when said valve is in its second position;

a bore located within said first piston;

a second variable stroke piston moveable along said bore with or independently of said first piston and can draw liquid into said bore when moved independently of said first piston and said valve is in its first position and to force liquid in said bore out of said outlet of said housing when said valve is in its second position, said housing is generally tubular with a first adjustable gauge extending into said housing and adapted to be set such that reproducible quantities of liquid can be dispensed from said housing and a second adjustable gauge extending into said housing such that reproducible quantities of liquid of smaller quantities then the first quantities of liquid can be discharged by said second piston, said first and second gauges are elongated and have holes located on one arm of each gauge, which are engageable by a respective pin located on a respective first and second releasable locking means, to position each gauge at a desired measure, said first piston comprises a hollow elongated shaft defining said bore, and said first locking means is secured to said dispenser housing, and comprises:

an outer shell able to move relative to said housing with said pin fixedly connected to said shell;

a spring means located between said housing and said shell and being opposite to the pin to bias said pin into engagement with a required hole in the first gauge, whereby when said shell is moved against said spring means said pin is withdrawn from engagement with a respective hole to allow movement of said first gauge parallel to a longitudinal axis of said dispenser housing;

said second piston has an elongated shaft ending through the hollow of said hollow shaft of said first piston and said second locking means comprises:

a second locking means housing positioned above said dispenser housing and through which slidably passes said first and second gauges with said hollow shaft fixedly secured to said locking housing with the elongated shaft of said second piston extending beyond said second locking means;

a second locking means outer shell surrounding said second locking means housing and able to move relative to said second locking means housing with said pin of said second locking means fixedly connected to said second locking means shell; and a spring means located between said second locking means housing and said second locking means shell and being opposite to said pin of said second locking means to bias said pin into engagement with a required hole in said second gauge, whereby second locking means shell is moved against said spring means of second locking means so that said second locking means pin is withdrawn from engagement with a respective hole of said second gauge to allow movement of the latter parallel to the longitudinal axis of said dispenser housing and second locking means housing.

* * * * *